United States Patent [19]
Guede

[11] Patent Number: 5,436,663
[45] Date of Patent: Jul. 25, 1995

[54] DEVICE FOR ENCODING DIGITAL SIGNALS REPRESENTING TELEVISION PICTURES

[75] Inventor: Frédérique Guede, Le Plessis Trevise, France

[73] Assignee: U.S. Philips Corporation, New York, N.Y.

[21] Appl. No.: 168,729

[22] Filed: Dec. 16, 1993

[30] Foreign Application Priority Data

Dec. 22, 1992 [FR] France .................. 92 15504

[51] Int. Cl.⁶ .............................. H04N 7/50
[52] U.S. Cl. .................................. 348/400
[58] Field of Search ............... 348/400, 409, 413, 416, 348/403, 405, 411, 412, 420, 421

[56] References Cited

U.S. PATENT DOCUMENTS

| | | |
|---|---|---|
| 5,091,782 | 2/1992 | Krause et al. |
| 5,093,720 | 3/1992 | Krause et al. ................. 348/413 |
| 5,136,371 | 8/1992 | Savatier et al. ............... 348/409 |
| 5,235,419 | 8/1993 | Krause .......................... 348/416 |

FOREIGN PATENT DOCUMENTS

| | | | |
|---|---|---|---|
| 0451545 | 10/1991 | European Pat. Off. | H04N 7/137 |
| 8702854 | 5/1987 | WIPO | H04N 7/133 |

*Primary Examiner*—Howard W. Britton
*Assistant Examiner*—Richard Lee
*Attorney, Agent, or Firm*—Michael E. Marion

[57] ABSTRACT

Device for encoding interlaced-field picture signals, comprising a first variable-length encoding channel (10) and an associated first prediction channel (20), as well as a second variable-length encoding channel (30), arranged in parallel with the first channel and including at its input side a circuit (31) for de-interlacing the fields, an associated second prediction channel (40) including a circuit (45) for re-interlacing the fields and a decision sub-assembly (50) for comparing the signals supplied by coding in the respective first and second encoding channels and selection of the prediction and encoding channels as a function of the result of said comparison.

6 Claims, 3 Drawing Sheets

DEVICE FOR ENCODING DIGITAL SIGNALS REPRESENTING TELEVISION PICTURES

FIELD OF THE INVENTION

The invention relates to a device for encoding digital signals corresponding to interlaced-field pictures, comprising a first variable-length encoding channel, which channel comprises a series arrangement of a first section for compressing interlaced data and an encoding section, and, in parallel therewith, a second variable-length encoding channel, which channel comprises a series arrangement of a second section for compressing non-interlaced data and an encoding section, and a first channel for prediction on the basis of output signals of said first section and, in parallel therewith, a second channel for prediction on the basis of output signals of said second section, said second section including at its input side a circuit for de-interlacing the fields and said second prediction channel including a circuit for re-interlacing the fields. This invention is particularly applicable for encoding television signals in accordance with the MPEG1 standard ("Moving Picture Expert Group" which is a work group in the International Standardization Organization dealing with the problem of encoding animated picture sequences).

BACKGROUND OF THE INVENTION

The specifications of the MPEG1 standard state that the treated pictures are necessarily in a sequential form. If the original pictures are television pictures, i.e. pictures having two interlaced fields, these two fields considered for MPEG encoding as information components taken at the same instant correspond, however, to a lesser extent to data which in reality are spaced apart by inter-field intervals of 20 ms. In picture sequences in which the motion is very rapid, such a significant inter-field motion contributes to picture faults, such as comb effects which are due to the appearance of parasitic frequencies in the blocks.

In accordance with the MPEG1 standard each picture is cut up into macroblocks of 16×16 pixels comprising four blocks of 8×8 pixels for the luminance and two blocks of 8×8 pixels for the chrominance. FIG. 1 shows in such a macroblock a vertical structure whose alignment is satisfactorily maintained in the absence of motion, even if the lines of this macroblock alternately correspond to the one or the other of the two interlaced fields which are 20 ms apart. FIG. 2 shows the same vertical structure in the case where the inter-field motion is significant and where the comb effect appears due to time-shifting of the information components of the odd lines and those of the even lines of the macroblock.

U.S. Pat. No. 5,091,782 describes a device for encoding digital video signals in which the two interlaced fields are treated in two distinct manners before encoding. On the one hand, the interlaced fields are separated and then subdivided into blocks which are subsequently each submitted to an orthogonal transform followed by a quantization, and on the other hand the blocks thus obtained and being in spatial conformity in the two fields are re-interlaced so as to be submitted to an orthogonal transform and a quantization. Error computations with respect to the signals before quantization are respectively effected on the two distinct sequences of signals thus quantized so that, in accordance with the motion in the original signals, the definitive selection of one of said two quantized signal sequences to be encoded can be made, viz. the sequence with which the smallest error is associated.

SUMMARY OF THE INVENTION

It is a an object of the invention to propose an encoding device making use of another type of technical solution for compressing the data in a more efficient manner while taking the more or less great significance of motion in the pictures into account.

To this end the invention relates to an encoding device as described in the opening paragraph, which is characterized in that it also comprises a decision sub-assembly comprising means for comparing the output signals of the first and second encoding channels and means for selecting the encoding and prediction channels in accordance with the result of said comparison.

The structure thus proposed has the particular advantage of a greater simplicity of implementation in the sense that, in contrast to the device described above, it does not require any error computation with respect to the original signals but is based solely on a comparison of the number of bits after encoding.

DESCRIPTION OF PREFERRED EMBODIMENTS

Figure 3:
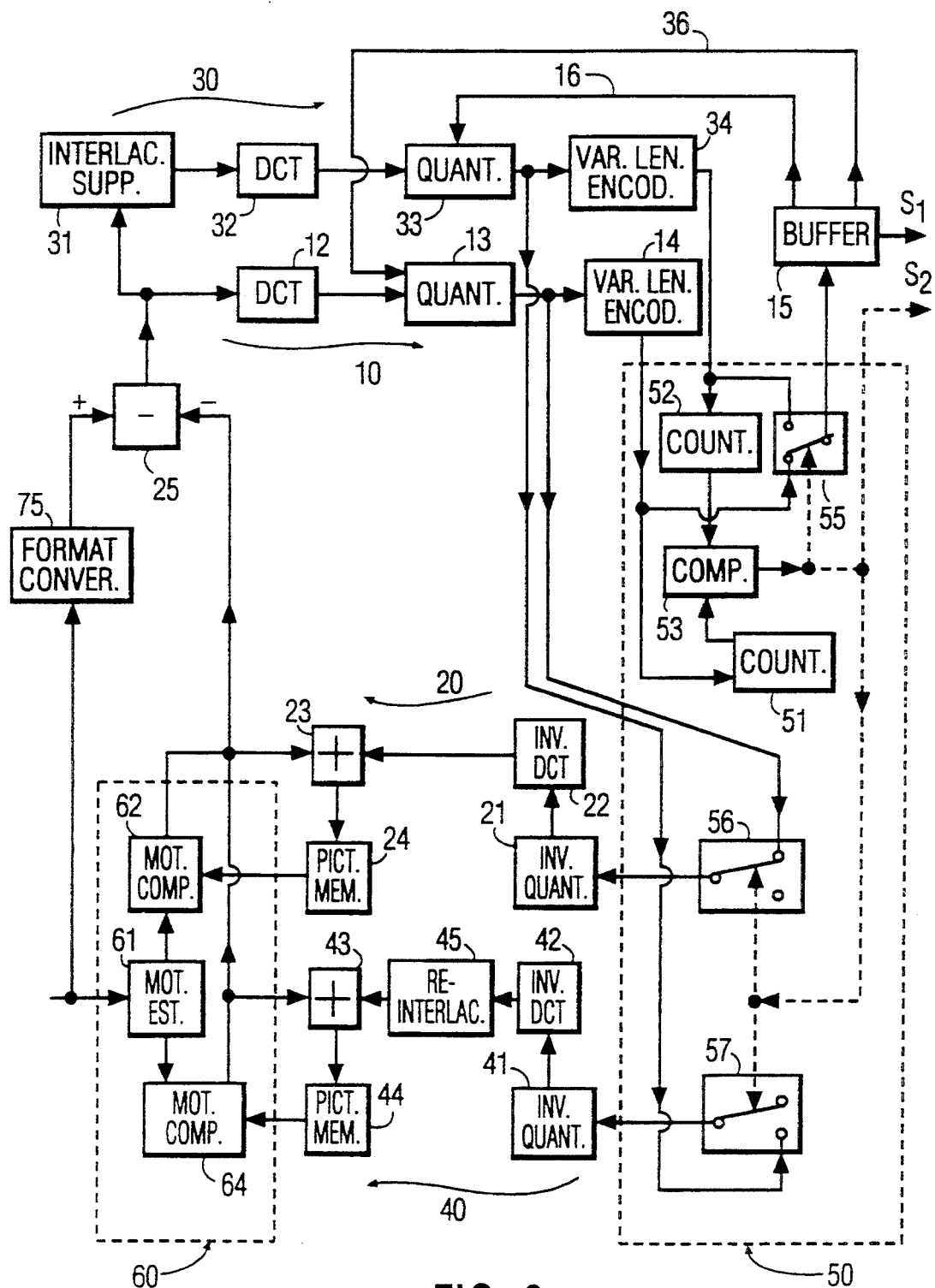
FIG. 3 shows an embodiment of an encoding device according to the invention.

The encoding device shown in FIG. 3 comprises a first encoding channel 10 receiving the digital signals to be encoded, and an associated first channel 20 for prediction on the basis of signals available before coding. The encoding channel 10 comprises a series arrangement of an orthogonal transform circuit 12 (a discrete cosine transform in this embodiment), a quantizing circuit 13, a variable-length encoding circuit 14 and a buffer memory 15 (whose output $S_1$ constitutes that of the encoding device), as well as a return connection 36 between this buffer memory and the circuit 13 for adjusting the quantization step and thus the bit rate. The prediction channel 20 receives the signals before encoding and comprises, at the output of the circuit 13, a series arrangement of an inverse quantizing circuit 21 and an inverse orthogonal transform circuit 22 (an inverse discrete cosine transform in this case) ensuring the respective inverse transforms of those performed by the circuits 13 and 12. The output signals of the circuit 22 are applied to a first input of an adder 23 whose output signal is stored in a picture memory 24.

The output signal of the memory 24 is applied to a motion compensation stage 60 which comprises a motion estimation circuit 61 and a motion compensation circuit 62. A first input of the circuit 62 receives the output signal of the memory 24 and a second input receives that of the circuit 61. The circuit 61 receives the digital input signals of the encoding device and determines, for each picture block, a displacement vector which is representative of its motion with respect to the corresponding block of a picture previously transmitted for encoding (this determination is known as block matching). The vector thus determined is applied to the second input of the motion compensation circuit 62. These displacement vectors are also supplied to the decoding device described hereinafter.

The circuit 62 supplies a predicted block whose difference with the preceding block is determined in a subtracter 25 which is arranged upstream of the orthogonal transform circuit 12. The predicted block is also applied to a second input of the adder 23. A first input of the subtracter 25 receives the output signal of a format conversion circuit 75 which receives the digital input signals of the device corresponding to the pictures to be presented at its output in the form of blocks. The digital signals at the input of the circuit 12 are thus signals representing the prediction error, i.e. the difference between each original picture block and the predicted block which is deducted therefrom after the operations performed in the prediction channel 20 between the input of the inverse quantizing circuit 21 and the output of the motion compensation circuit 62.

The device of FIG. 3 also comprises a second variable-length encoding channel 30 with an associated second prediction channel 40, and a decision sub-assembly 50. The second encoding channel 30, arranged in parallel with the first encoding channel, comprises, at the output of the subtracter 25, a series arrangement of a circuit 31 for suppressing the field interlacing, a second orthogonal transform circuit 32, a second quantizing circuit 33 and a second variable-length encoding circuit 34. The channel 30 also includes the buffer memory 15, as well as a second return connection 16 connecting the buffer memory 15 to the circuit 33, as described hereinbefore, for adjusting the quantization step and the bit rate. Similarly as the first channel, the second prediction channel 40 associated with this channel 30 comprises a series arrangement of a second inverse quantizing circuit 41, a second inverse orthogonal transform circuit 42, a second adder 43, a second picture memory 44 and, in the motion compensation stage 60, a second motion compensation circuit 64. The channel 40 also comprises, in series between the circuits 42 and 43, a circuit 45 for re-interlacing fields. The output of the channel 40, i.e. that of the circuit 64, is coupled to that of the first prediction channel 20 (i.e. that of the circuit 62) so as to be applied in common to the negative input of the subtracter 25. The second circuits 32, 33, 34, 41, 42, 43, 44, 64 are identical to the first circuits 12, 13, 14, 21, 22, 23, 24, 62, respectively.

The decision sub-assembly 50 comprises a comparison stage and a selection stage. The comparison stage comprises a first counter 51 for counting the number of bits at the output of the encoding circuit 14, a second counter 52 for counting the number of bits at the output of the encoding circuit 34 and a comparator 53 for comparing these two numbers. The selection stage, controlled by the output signal of the comparator 53, comprises a first switch 55 whose non-common terminals are connected to the outputs of the two encoding circuits 14 and 34, respectively and whose common terminal is connected to the input of the buffer memory 15 for applying the output signal of one of these circuits 14 and 24 to said buffer memory, and first and second switches 56 and 57 for connecting or not connecting each prediction channel at the output of the quantizing circuit of the associated encoding channel. A signal $S_2$ (constituted by a single bit in this case) is supplied by the decision sub-assembly 50 so as to be applied, after transmission, to the decoding device described hereinafter and to indicate whether the lines of the macroblock under consideration have been de-interlaced or not.

Figure 1:
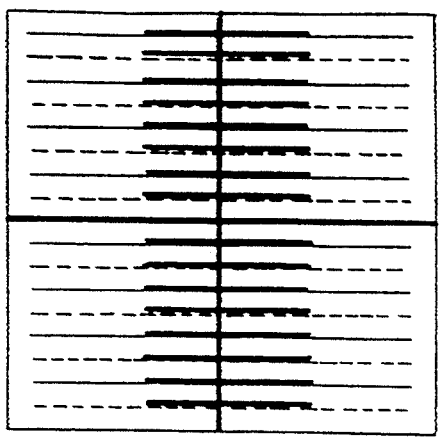
FIGS. 1 and 2 show the fault referred to as "comb structure" in a part of the picture which is a sub-assembly constituted by four luminance blocks, during significant movements in the picture.
Figure 2:
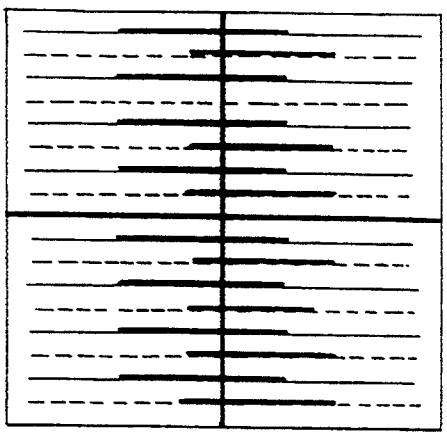
Figure 4:
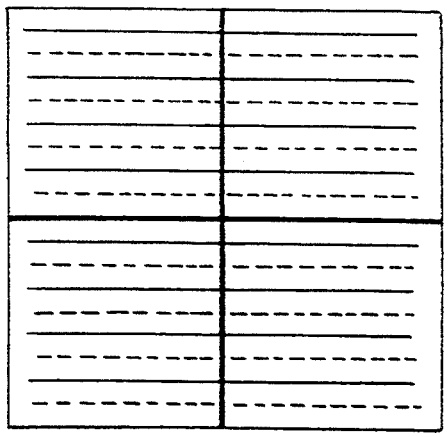
FIGS. 4 and 5 show the same assembly of four picture blocks available before encoding in the first and second encoding channels, respectively.
Figure 5:
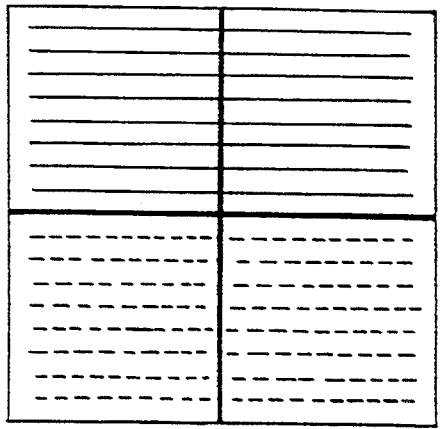

This device shown in FIG. 3 operates as follows. It is known that the digital input signals of the device correspond originally to television pictures composed of two interlaced fields, but for which this initial interlacing is converted, macroblock by macroblock, into a sequential arrangement. The above-described device according to the invention uses a given criterion, in this case the a posteriori evaluation of the number of bits provided by encoding, with and without interlacing of the lines of each macroblock thus obtained (i.e. having this sequential arrangement) for either encoding and prediction of the remaining signals as arranged in FIG. 4 where the lines of the macroblock correspond to the original interlaced fields, or, instead, of de-interlaced signals as shown in FIG. 5 where the eight lines of the odd field are, for example placed in the upper part of the macroblock and the eight lines of the even field are placed in the lower part. In the latter case, the fact that the macroblock is previously de-interlaced provides the possibility of performing the orthogonal transform, followed by quantization and encoding on the basis of coherent blocks. FIG. 2 makes it clear how this coherence is re-established if, in the vertical structure shown in this FIG. 2, the information components situated furthest to the left (lines of an odd field) and the information components situated furthest to the right (lines of the corresponding even field) are now regrouped into upper and lower parts, respectively, of this macroblock after suppression of the macroblock interlacing.

Figure 6:
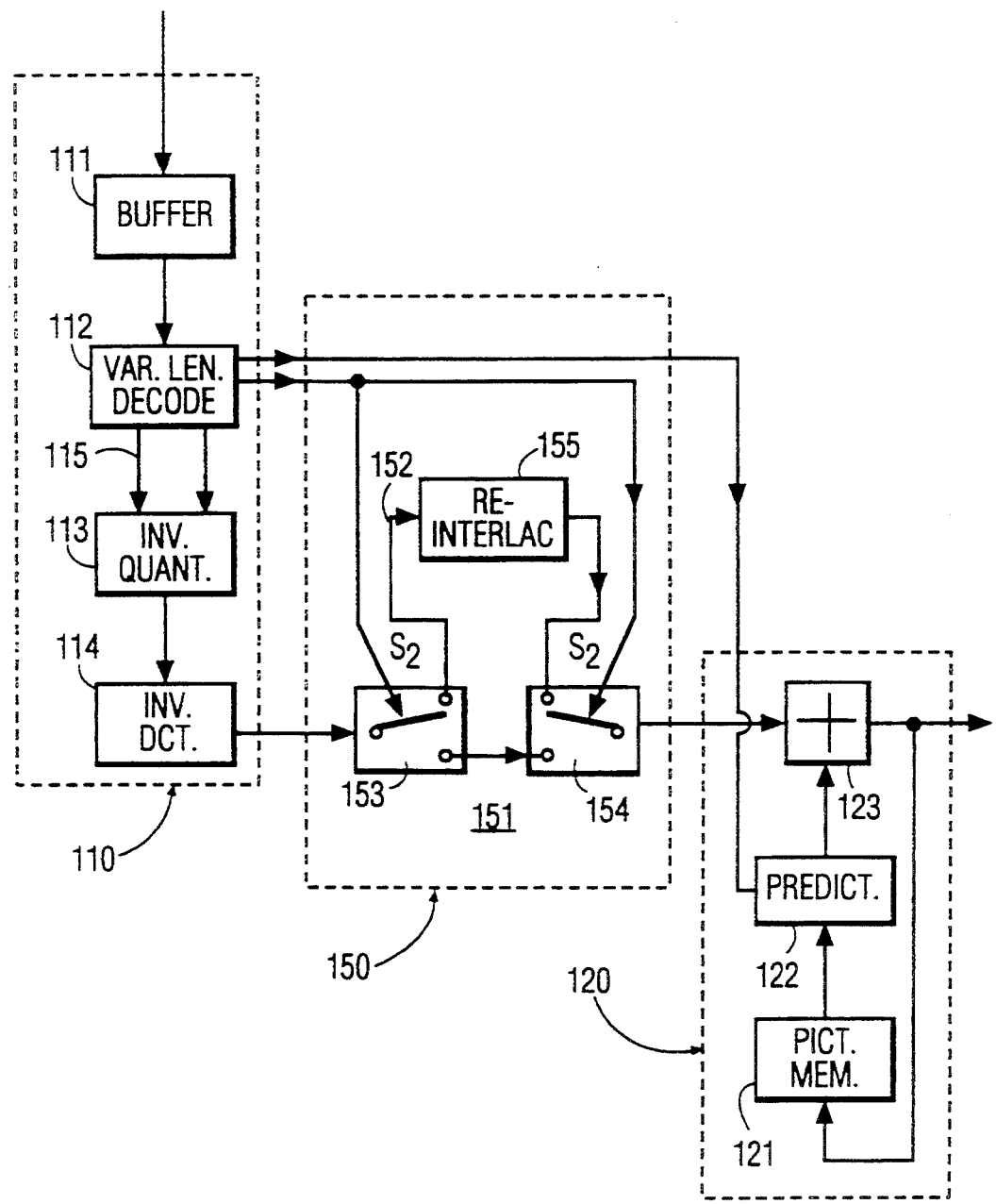
FIG. 6 shows an embodiment of a decoding device which is suitable for processing encoded signals received from the encoding device according to the invention.

Conversely, when digital signals originally corresponding to interlaced television pictures are treated, as described hereinbefore, in an encoding device of the type shown in FIG. 3, the signals thus encoded may be decoded in a decoding device of the type as shown in FIG. 6. This decoding device comprises a decoding channel 110 and a prediction sub-assembly 120, and, between this decoding channel and said prediction sub-assembly, a second decision sub-assembly 150.

The decoding channel 110 comprises a series arrangement of a buffer memory 111, a variable-length decoding circuit 112, an inverse quantizing circuit 113, an inverse orthogonal transform circuit 114 (here an inverse discrete cosine transform), as well as a complementary connection 115 between the circuits 112 and 113 intended to furnish the value of the quantization step for the inverse quantizing circuit from the assembly of encoded signals from the encoding device.

The prediction sub-assembly 120 comprises a series arrangement of a picture memory 121 furnishing the output signal of the decoding device, a circuit 122 for prediction on the basis of the contents of the picture memory 121 on the one hand and of each displacement vector also provided by the variable-length decoding circuit 112 on the other hand, (the displacement vectors are also transmitted in said assembly of encoded signals), and an adder 123 whose first input receives the output signal of the decoding channel 110 via the second decision sub-assembly 150 and whose second input receives the output signal of said prediction circuit 122.

The output of this adder 123 constitutes the output of the decoding device.

The second decision sub-assembly 150 comprises two parallel paths 151 and 152 between the respective non-common terminals of the two switches 153 and 154. The common terminal of the switch 153 receives the output signal of the decoding channel 110 (i.e. that of the inverse orthogonal transform circuit 114), while the common terminal of the switch 154 constitutes the first input of the adder 123. The path 151 is a direct path for transmitting the output signal of the decoding channel 110 to the adder 123, while the path 152 ensures the same transmission, but this time via a circuit 155 for re-interlacing the fields of the pictures. The switches 153 and 154 are controlled in synchronism by the signal $S_2$ supplied in the encoding device by the first decision sub-assembly 50 and indicating whether in the encoding section the odd and even lines of the macroblock under consideration have been de-interlaced or not.

I claim:

1. A device for encoding digital signals corresponding to interlaced-field pictures, comprising:
   (A) a first variable-length encoding channel (10) producing first encoded output signals and comprising:
      (i) a first series arrangement of a first compressing section for compressing interlaced data and having an input and producing at an output first compressed output signals and a first encoding section,
   (B) a second variable-length encoding channel (30) producing second encoded output signals and comprising:
      (i) a second series arrangement of a second compressing section for compressing de-interlaced data and having an input and producing at an output second compressed output signals and a second encoding section,
   (C) said first and second variable-length encoding channels being connected in parallel,
   (D) a first prediction channel for predicting on the basis of first compressed output signals received from the first compressing section and having an output,
   (E) a second prediction channel for predicting on the basis of second compressed output signals received from the second compressing section and having an output,
   (F) said first and second prediction channels being connected in parallel,
   (G) a de-interlacing circuit (31) for receiving digital signals and for de-interlacing the fields and having an output connected to the input of the said second compressing section,
   (H) said second prediction channel further including an interlacing circuit (45) for re-interlacing fields,
   (I) a decision sub-assembly (50) connected to receive the first and second encoded output signals from the first and second encoding channels and for comparing said first and second encoded output signals,
   (J) said decision sub-assembly further comprising means connected to receive, and responsive to, the result of the comparing performed by the decision sub-assembly for selecting the first encoding channel and the first prediction channel or the second encoding channel and the second prediction channel for further processing of the digital signals.

2. The device of claim 1, wherein:
   (K) the first compressing section comprises a third series arrangement of a first orthogonal transform circuit (12) and a first quantizing circuit (13) having an output,
   (L) the first variable-length encoding channel further comprises:
      (i) a buffer memory (15),
      (ii) a return connection between the buffer memory and the first quantizing circuit,
   (M) the second compressing section further comprises a fourth series arrangement of a second orthogonal transform circuit (32) and a second quantizing circuit (33) having an output,
   (N) the second variable-length encoding channel comprises:
      (i) the buffer memory,
      (ii) a return connection between the buffer memory and the second quantizing circuit.

3. The device of claim 2, wherein:
   (O) the first prediction channel comprises:
      (i) a fifth series arrangement of a first inverse quantizing circuit (21) connected to the first quantizing circuit output, a first inverse orthogonal transform circuit (22), a first adder (23) having a first input connected to the first inverse orthogonal transform circuit and a second input, a first picture memory (24), and a first motion compensation circuit (62) having an output connected to the second input of the first adder,
   (P) the second prediction channel comprises:
      (i) a sixth series arrangement of a second inverse quantizing circuit (41) connected to the second quantizing circuit output, a second inverse orthogonal transform circuit (42), a second adder (43) having a first input connected to a re-interlacing circuit (45) and a second input, the re-interlacing circuit connected to an output of the second inverse orthogonal transform circuit, a second picture memory (44), and a second motion compensation circuit (64) having an output connected to the second input of the second adder.

4. The device of claim 3, further comprising:
   (Q) a subtractor (25) having a positive and a negative input and an output,
   and wherein:
   (R) the outputs of the first and second prediction channels being connected in common to the subtractor's negative input, the subtractor's output being connected to the inputs of the first and second variable-length encoding channels.

5. The device of claim 4, wherein the first and second encoded output signals are constituted of a number of bits and wherein:
   (S) said decision sub-assembly comprising:
      (i) means for counting (51, 52) the number of bits in the first and second encoded output signals of the first and second variable length encoding channels, respectively and for comparing (53) the number of bits counted and for producing an output indicating which of the first and second variable-length encoding channels produced the smaller number of bits,
      (ii) a selection stage connected to and responsive to the output of the counting and comparing means for selecting the encoding channel producing the smaller number of bits.

6. The device of claim 5, wherein:
(T) the selection stage comprises:
  (i) a first switch (55) for performing the selection of the encoding channel and second (56) and third (57) switches for selecting the prediction channel corresponding to the encoding channel selected by the first switch.

* * * * *